United States Patent
Roske et al.

(10) Patent No.: US 6,509,552 B1
(45) Date of Patent: Jan. 21, 2003

(54) TEMPERATURE-CONTROLLED STEERING WHEEL

(76) Inventors: Edward K. Roske, 7030 - 41st St., Vero Beach, FL (US) 32967; Daniel Votrobek, 7030 - 41st St., Vero Beach, FL (US) 32967

( * ) Notice: Subject to any disclaimer, the term of this patent is extended or adjusted under 35 U.S.C. 154(b) by 0 days.

(21) Appl. No.: 10/090,105

(22) Filed: Mar. 5, 2002

(51) Int. Cl.[7] .................................................. H05B 1/02
(52) U.S. Cl. ........................ 219/497; 219/204; 219/507; 219/535; 165/41
(58) Field of Search .................................. 219/202–206, 219/497, 507, 554, 535; 165/41, 42; 62/3; 454/140, 152

(56) References Cited

U.S. PATENT DOCUMENTS

| | | | | |
|---|---|---|---|---|
| 1,125,889 A | * | 1/1915 | Smith | 219/205 |
| 1,366,554 A | * | 1/1921 | Blackburn | 219/205 |
| 4,640,340 A | * | 2/1987 | Noda et al. | 165/41 |
| 5,605,643 A | * | 2/1997 | Reece | 219/204 |
| 6,007,420 A | * | 12/1999 | Harm et al. | 454/140 |
| 6,172,342 B1 | * | 1/2001 | Khafagy et al. | 219/497 |

* cited by examiner

*Primary Examiner*—Mark Paschall

(57) ABSTRACT

A temperature-controlled steering wheel for heating and cooling the user's hands while steering a vehicle. The temperature-controlled steering wheel includes a steering wheel member having an arcuate channel disposed therein; and also includes an arcuate outer tubular member being disposed in the endless channel of the steering wheel member; and further includes an arcuate inner tubular member being disposed in the endless channel of the steering wheel member and the outer tubular member; and also includes an assembly for heating the steering wheel member including a liquid being disposed in the inner tubular member.

6 Claims, 3 Drawing Sheets

TEMPERATURE-CONTROLLED STEERING WHEEL

BACKGROUND OF THE INVENTION

1. Field of the Invention

The present invention relates to heating/cooling steering wheels and more particularly pertains to a new temperature-controlled steering wheel for heating and cooling the user's hands while steering a vehicle.

2. Description of the Prior Art

The use of heating/cooling steering wheels is known in the prior art. More specifically, heating/cooling steering wheels heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,640,340; U.S. Pat. No. 5,580,741; U.S. Pat. No. 6,007,420; U.S. Pat. No. 5,605,643; U.S. Pat. No. 6,172,342; and U.S. Pat. No. Des. 418,786.

While these devices fulfill their respective, particular objectives and requirements, the aforementioned patents do not disclose a new temperature-controlled steering wheel. The prior art describes inventions having heating/cooling elements disposed in the steering wheel and having control switches for controlling the heating/cooling elements.

SUMMARY OF THE INVENTION

The general purpose of the present invention, which will be described subsequently in greater detail, is to provide a new temperature-controlled steering wheel which has many of the advantages of the heating/cooling steering wheels mentioned heretofore and many novel features that result in a new temperature-controlled steering wheel which is not anticipated, rendered obvious, suggested, or even implied by any of the prior art heating/cooling steering wheels, either alone or in any combination thereof. The present invention includes a steering wheel member having an endless channel disposed therein; and also includes an arcuate outer tubular member being disposed in the endless channel of the steering wheel member; and further includes an arcuate inner tubular member being disposed in the endless channel of the steering wheel member and the outer tubular member; and also includes an assembly for heating the steering wheel member including a liquid being disposed in the inner tubular member. None of the prior art describes inventions having inner and outer tubular members and also having liquid contained in the inner tubular member and being used to either warm or cool the steering wheel member.

There has thus been outlined, rather broadly, the more important features of the temperature-controlled steering wheel in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new temperature-controlled steering wheel which has many of the advantages of the heating/cooling steering wheels mentioned heretofore and many novel features that result in a new temperature-controlled steering wheel which is not anticipated, rendered obvious, suggested, or even implied by any of the prior art heating/cooling steering wheels, either alone or in any combination thereof.

Still another object of the present invention is to provide a new temperature-controlled steering wheel for heating and cooling the user's hands while steering a vehicle.

Still yet another object of the present invention is to provide a new temperature-controlled steering wheel that is easy and convenient to use.

Even still another object of the present invention is to provide a new temperature-controlled steering wheel that would eliminate a using having to wear gloves which could result in hampering the user's ability to steer one's vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
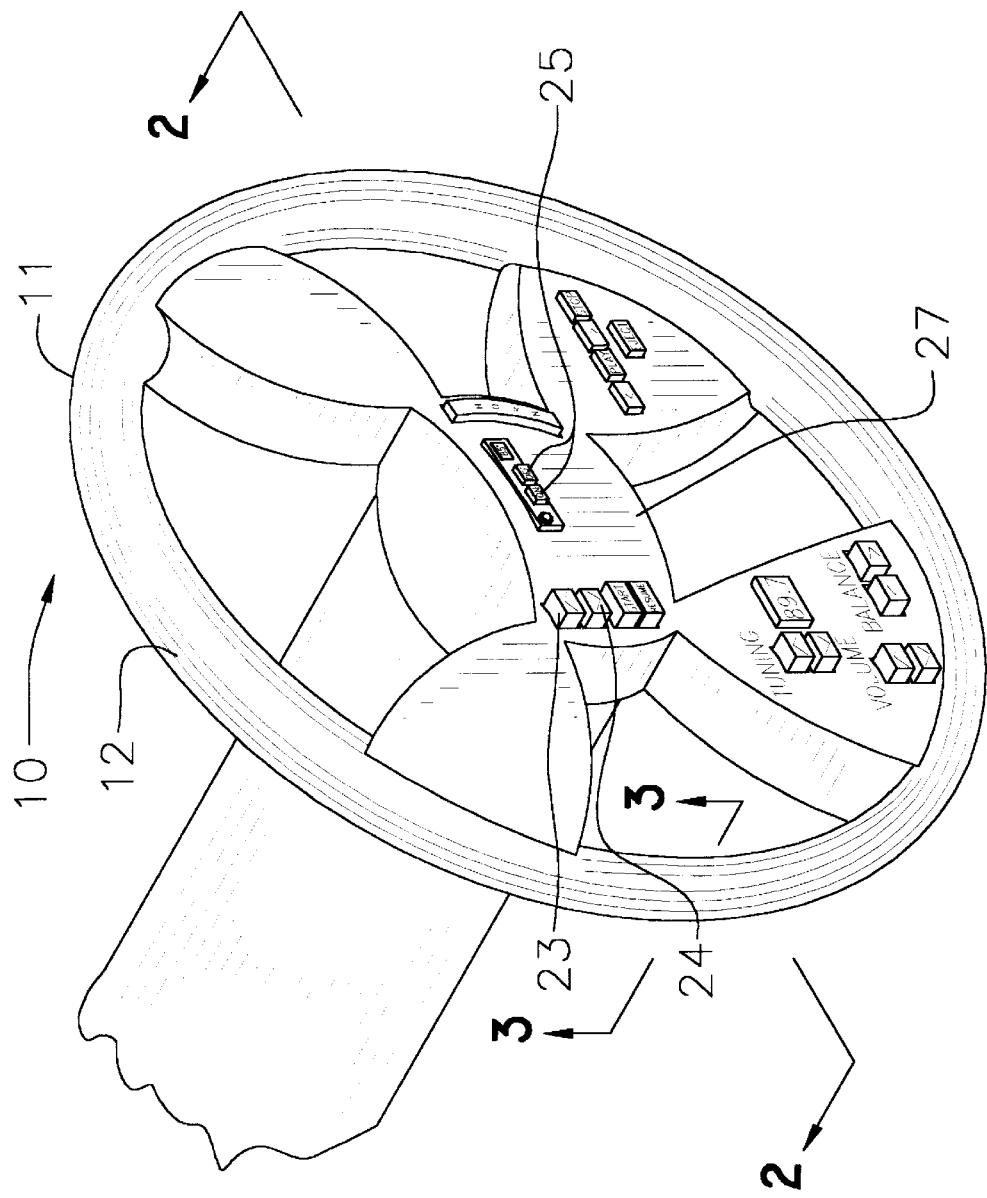
FIG. 1 is a perspective view of a new temperature-controlled steering wheel according to the present invention and shown in use.
Figure 2:
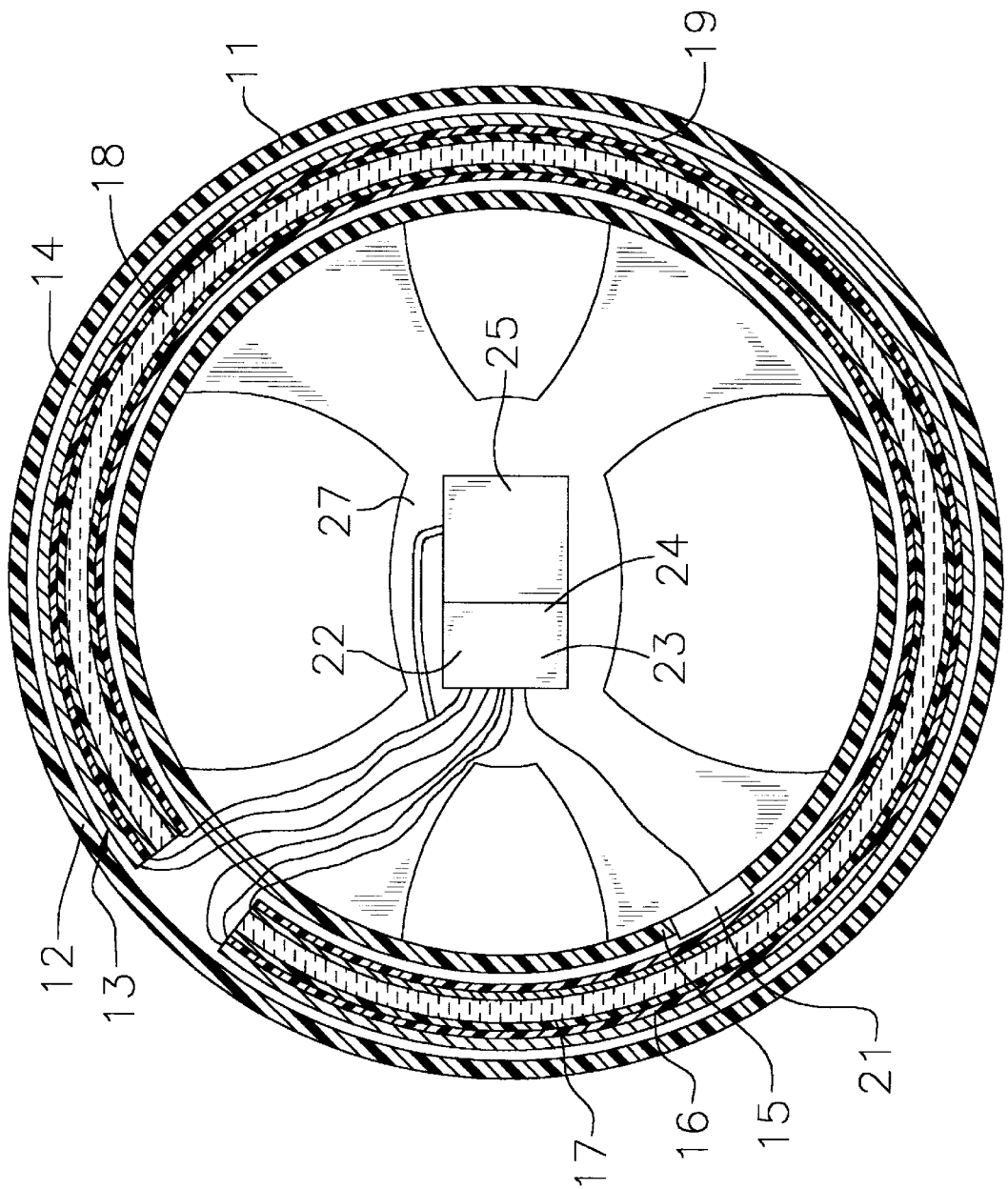
FIG. 2 is a longitudinal cross-sectional view of the present invention.
Figure 3:
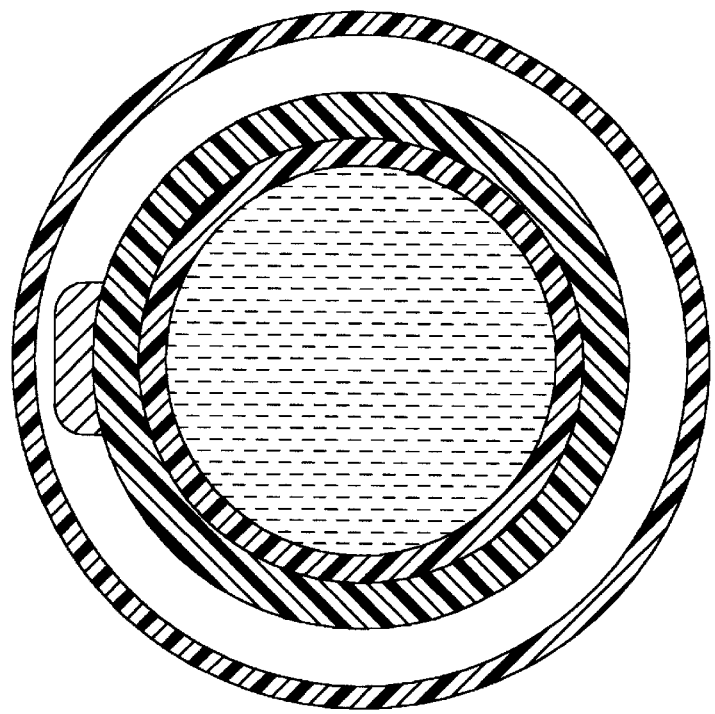
FIG. 3 is a lateral cross-sectional view of the present invention.
Figure 4:
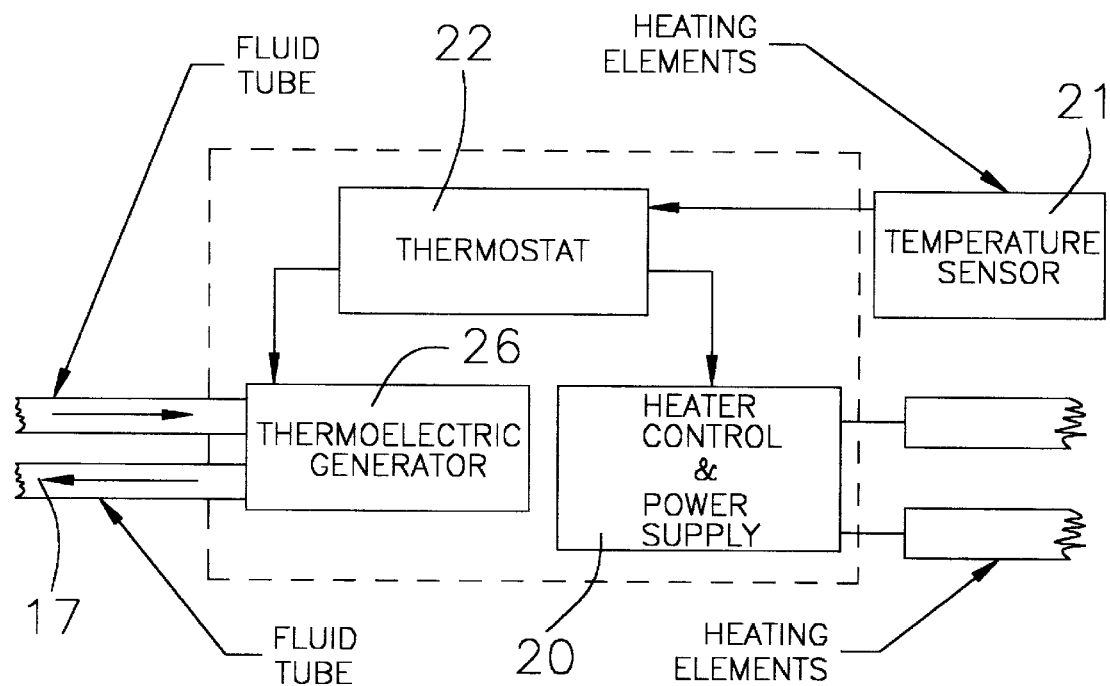
FIG. 4 is a schematic view of the present invention.

With reference now to the drawings, and in particular to FIGS. 1 through 4 thereof, a new temperature-controlled steering wheel embodying the principles and concepts of the present invention and generally designated by the reference numeral 10 will be described.

As best illustrated in FIGS. 1 through 4, the temperature-controlled steering wheel 10 generally comprises a steering wheel member 11 having an endless main tubular member 12 and an endless channel 13 disposed in the endless main tubular member 12. An arcuate outer tubular member 16 having closed ends is conventionally disposed in the endless channel 13 of the endless main tubular member 12. An arcuate inner tubular member 17 having closed ends is conventionally disposed in the outer tubular member 16.

Means for heating the steering wheel member 11 includes a liquid 18 being disposed in the inner tubular member 17, and also includes conventional heating elements 19 being conventionally disposed in the endless channel 13 between the outer tubular member 16 and a wall 14 defining the endless channel 13 for heating the liquid 18, and further includes a power supply 20 being conventionally connected to the heating elements 19, and also includes a plurality of control members being conventionally connected to the heating elements 19 and to the power supply 20 for energizing the heating elements 19. The control members includes a temperature sensor 21 being conventionally disposed in an outer wall 15 of the endless main tubular member 12, and also includes a thermostat 22 being conventionally connected to the temperature sensor 21 and to the heating elements 19 and to the power supply 20, and further includes temperature control switches 23–25 being conventionally mounted upon the steering wheel member 11 and being conventionally connected to the thermostat 22, also includes a thermoelectric generator 26 being conventionally connected to the liquid 18 in the inner tubular member 17 and being conventionally connected to the thermostat 22, and further includes a power switch 25 being conventionally connected to the power supply 20 and to the heating elements 19 and to the thermoelectric generator 26. The temperature control switches 23,24 and the power switch 25 include button-like members being depressibly mounted upon a surface of a cross member 27 of the steering wheel member 11. The button-like members include a temperature increase button-like member 23, and also include a temperature decrease button-like member 24. The thermoelectric generator 26 is conventionally disposed in the inner tubular member 17 with the liquid 18 passing therethrough to effectively cool the liquid 18.

In use, the user presses the power switch 25 to energize either the heating elements 19 or the thermoelectric generator 26, and depresses the temperature control switches 23,24 to select whether the user wants the steering wheel 10 to either warm up or cool down depending upon the time of the year.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the temperature-controlled steering wheel. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A temperature-controlled steering wheel comprising:
   a steering wheel member having an endless main tubular member and an endless channel disposed in said endless main tubular member;
   an arcuate outer tubular member having closed ends and being disposed in said endless channel of said endless main tubular member;
   an arcuate inner tubular member being disposed in said outer tubular member; and
   means for heating said steering wheel member including a liquid being disposed in said inner tubular member.

2. A temperature-controlled steering wheel as described in claim 1, wherein said means for heating said steering wheel member also includes heating elements being disposed in said endless channel between said outer tubular member and a wall defining said endless channel for heating said liquid, and further includes a power supply being connected to said heating elements, and also includes a plurality of control members being connected to said heating elements and to said power supply for energizing said heating elements.

3. A temperature-controlled steering wheel as described in claim 2, wherein said control members includes a temperature sensor being disposed in an outer wall of said steering wheel member, and also includes a thermostat being connected to said temperature sensor and to said heating elements and to said power supply, and further includes temperature control switches being mounted upon said steering wheel member and being connected to said thermostat, also includes a thermoelectric generator being connected to said liquid in said inner tubular member and being connected to said thermostat, and further includes a power switch being connected to said power supply and to said heating elements and to said thermoelectric generator.

4. A temperature-controlled steering wheel as described in claim 3, wherein said temperature control switches and said power switch include button-like members being depressibly mounted upon a surface of a cross member of said steering wheel member.

5. A temperature-controlled steering wheel as described in claim 4, wherein said button-like members include a temperature increase button-like member, and also include a temperature decrease button-like member.

6. A temperature-controlled steering wheel as described in claim 3, wherein said thermoelectric generator is disposed in said inner tubular member with said liquid passing therethrough to effectively cool said liquid.

* * * * *